United States Patent [19]

Smith

[11] Patent Number: 4,928,094

[45] Date of Patent: May 22, 1990

[54] BATTERY-OPERATED DATA COLLECTION APPARATUS HAVING AN INFRARED TOUCH SCREEN DATA ENTRY DEVICE

[75] Inventor: Mark L. Smith, Seattle, Wash.

[73] Assignee: The Boeing Company, Seattle, Wash.

[21] Appl. No.: 148,421

[22] Filed: Jan. 25, 1988

[51] Int. Cl.$^5$ ............................................. G09G 3/02
[52] U.S. Cl. ................................... 340/712; 250/221; 357/30
[58] Field of Search .................... 340/706, 711, 712; 178/18, 19, 20; 371/66; 365/228; 357/30; 250/216, 221

[56] References Cited

U.S. PATENT DOCUMENTS

| | | | |
|---|---|---|---|
| 3,775,560 | 11/1973 | Ebeling et al. | 178/18 |
| 3,860,754 | 1/1975 | Johnson et al. | 178/18 |
| 4,224,615 | 9/1980 | Penz | 340/712 |
| 4,243,879 | 1/1981 | Carroll et al. | 250/221 |
| 4,313,109 | 1/1982 | Funk et al. | 340/712 |
| 4,584,663 | 4/1986 | Tanikawa | 365/228 |
| 4,672,364 | 6/1987 | Lucas | 340/712 |
| 4,725,694 | 2/1988 | Auer et al. | 340/712 |
| 4,746,919 | 5/1988 | Reitmeier | 340/712 |
| 4,761,637 | 8/1988 | Lucas et al. | 340/712 |
| 4,799,044 | 1/1979 | Masters et al. | 340/712 |
| 4,806,749 | 2/1989 | Ohuchi et al. | 340/712 |

OTHER PUBLICATIONS

TRW Data Sheet, "GaAlAs Plastic Infrared Emitting Diodes", Jan. 1985.

*Primary Examiner*—David K. Moore
*Assistant Examiner*—Richard Hjerpe
*Attorney, Agent, or Firm*—Dellett, Smith-Hill and Bedell

[57] ABSTRACT

A portable self-contained remote access terminal comprises a matrix display device and a touch screen device having a touch surface which overlies the display device so that the display device can be seen through the touch surface. The touch screen device comprises an array of infrared emitter elements for emitting respective beams over a sensing space, a corresponding array of detector elements for receiving the beams respectively, driver circuits for intermittently and sequentially energizing the emitter elements at a power level at least 10 times the rated constant power level of the emitter elements at a frequency of at least about 20 Hz and at a duty cycle substantially less than about two percent, a multiplexer operative when the emitter element is energized to select the corresponding detector element, and a voltage detector for determining whether the selected detector element is illuminated. The terminal also comprises a data storage device in which data for determining the nature of the display provided by the display device is stored, and in which data provided by way of the touch screen device is stored. A battery pack which is incorporated in the terminal is used to operate the data storage device, the display device and the touch screen device.

23 Claims, 4 Drawing Sheets

BATTERY-OPERATED DATA COLLECTION APPARATUS HAVING AN INFRARED TOUCH SCREEN DATA ENTRY DEVICE

BACKGROUND OF THE INVENTION

This invention relates to battery-operated data collection apparatus having an infrared touch screen data entry device.

In manufacture of an aircraft, it is necessary to carry out numerous tests to ensure that the subsystems within the aircraft have been installed and connected properly and will operate in the desired fashion. Some of these tests can be carried out using automatic diagnostic equipment which is connected to a diagnostic port of the aircraft. Test signals are applied to the diagnostic port and measurement results are detected by the diagnostic equipment and transmitted to a host computer. However, many tests must still be carried out manually by a technician. In order to carry out these manual tests, the technician is provided with numerous sheets of paper having the test procedures described thereon. A test procedure might direct the technician to measure a quantity and enter the result, or determine whether a defined condition exists. These test sheets are attached to a clipboard, and the technician follows the directions and enters the test results on the sheets. When the tests have been completed, the test sheets are given to a data entry operator, who enters the test results into the host computer by way of a conventional data entry terminal. The computer diagnoses the test results to determine whether they indicate a fault condition and, if so, provides the information necessary to identify and remedy the fault condition.

This conventional test procedure is subject to disadvantage in that the test sheets may be torn, soiled or misplaced. Transcribing the test results from the test sheets is an error-prone operation. Moreover, the technician is required to carry not only the clipboard but also a pencil to write down the test results and this is inconvenient since most tests will require the technician to put the pencil down and then retrieve it in order to write down the results.

Portable computers, having an LC (liquid crystal) display and a conventional QWERTY keyboard are known. Such a portable computer may be coupled to a host computer for transmission of data therebetween. However, a portable computer is not suitable as a substitute for test sheets attached to a clipboard in carrying out manual tests on an aircraft, because it is then necessary for the technician to pay attention to two distinct areas, namely the display for reading instructions with respect to a test and the keyboard for entry of information relating to the result of the test. Moreover, conventional computer keyboards may be intimidating to some technicians, thus increasing the incidence of error.

SUMMARY OF THE INVENTION

A preferred embodiment of a first aspect of the invention is a portable, self-contained remote access terminal which comprises a matrix display device and a touch screen device having a touch surface which overlies the display device so that the display device can be seen through the touch surface. The terminal also comprises a data storage device in which data for determining the nature of the display provided by the display device is stored, and in which data provided by way of the touch screen device is stored. A battery pack which is incorporated in the terminal is used to operate the data storage device, the display device and the touch screen device.

It is preferred that the display device be a liquid crystal display device because a liquid crystal display device has a very low power consumption and is therefore particularly well suited for battery-operated applications. Moreover, it is preferred that circuitry used in connection with the display device and the touch screen device be fabricated using CMOS technology in order to minimize power consumption.

Several types of touch screen devices are known, including capacitive, resistive and infrared touch screen devices. Resistive and capacitive touch screen devices both have a more or less stiff touch surface which the user touches when entering data. In the capacitive and resistive touch screen devices, the touch surface is a surface of a membrane which interacts with circuits of the touch screen devices for entry of data. In the case of the infrared touch screen, a matrix plane of light beams is provided by an array of light sources, and light detectors detect whether a beam of light has been broken. Entry of data is effected by use of a passive probe to penetrate the matrix plane. The membranes of capacitive and resistive touch screen devices are at least partially opaque, and therefore they are not well suited to use with a liquid crystal display device, which does not emit light but provides a display by reflection of light. Moreover, if the membrane of a capacitive or resistive touch screen device is damaged, the entire device must normally be replaced. Since an infrared touch screen device does not require a membrane, but only an array of light sources and an array of light detectors, the area that is penetrated by the passive probe in order to enter data is completely transparent and does not interfere significantly with passage of light to and from the display device, and if the plate is damaged it is not generally necessary to replace the entire touch screen device. However, conventional infrared touch screen devices are not generally suitable for use in battery-powered instruments, because of their high power consumption. For example, the rated constant power level of an LED might be 100 mwatts, so that such an LED would require a current of about 20 mA at 5 volts DC if it remained on continuously. A typical touch screen device having 48 such LEDs would consume 4.8 watts. If the LEDs were not held on continuously but were strobed, each LED might be able to tolerate a current of 200 milliamp at 5 volts DC for intervals of 1.04 ms at a frequency of 20 Hz, i.e. a duty cycle of 2%. This would lead to a total power consumption of 1 watt. For a portable, battery operated, self-contained instrument, which should weigh less than about three pounds and should be able to operate for eight hours without need for recharging, the power consumption of the touch screen device should be less than 10 mw.

A preferred embodiment of a second aspect of the invention is an input device which responds to entry of a probe into a sensing space and comprises at least one emitter element for emitting a beam over the sensing space, at least one detector element for receiving the beam, means for intermittently energizing the emitter element at a power level about 10 times the rated constant power level of the emitter element, at a frequency of at least about 20 Hz and at a duty cycle substantially less than about two percent, and means operative when the emitter element is energized to determine whether the beam emitted by the emitter element is reaching the detector element.

Conventional infrared touch screen devices employ phototransistors as the detector elements. Light strikes the detector junction of the phototransistor and causes current to flow in the junction. An output voltage is developed across a load connected to the phototransistor. The output voltage is sampled and the sample value is compared with a threshold level. If the sample value is above the threshold level, it is inferred that the beam provided by the associated emitter element is not being blocked. However, the detector junction exhibits capacitance. Therefore, when the phototransistor is illuminated, the current conducted by the phototransistor does not increase stepwise to the level associated with the intensity of illumination. Rather, the current ramps up to that level over a significant interval. Consequently, the output voltage of the phototransistor should not be sampled immediately the corresponding LED turns on, but after a waiting period to allow the current to increase. Moreover, the capacitance of the detector junction prevents the output voltage from collapsing immediately the phototransistor ceases to receive light. Accordingly, there is a possibility that the output voltage provided by the phototransistor will be high enough to indicate that the phototransistor is receiving the beam provided by its associated emitter element when in fact the beam is blocked.

A preferred embodiment of a third aspect of the invention is photoelectric apparatus which comprises an emitter element for emitting a beam of infrared light and a detector element for receiving light emitted by the emitter element. The detector element is a semiconductor device having a semiconductor junction and an output terminal at which a voltage representative of intensity of light falling on the junction is developed. A switch selectively grounds the output terminal of the detector element.

It is therefore an object of the invention to provide a portable, self-contained, battery-operated data collection apparatus having an infrared touch screen data entry device.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
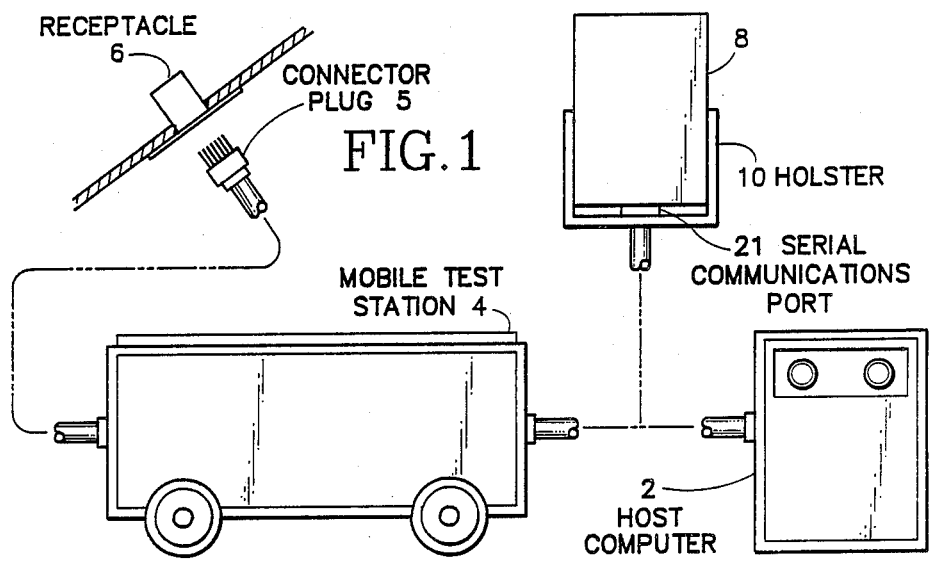
FIG. 1 is a block diagram of a test system including a remote access terminal.
Figure 2:
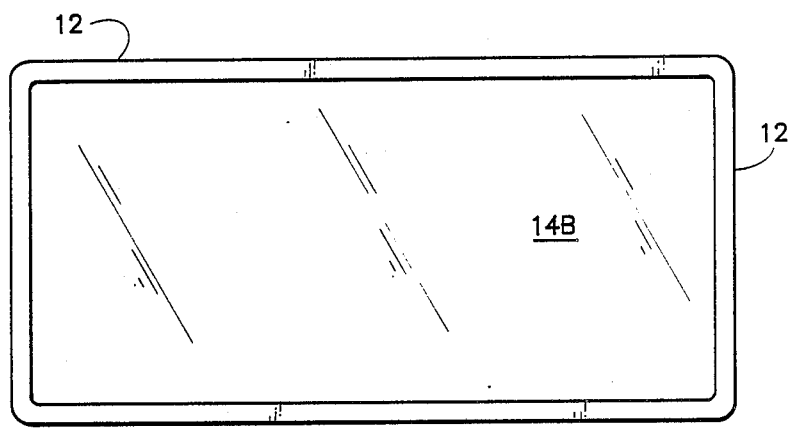
FIG. 2 is a plan view of the remote access terminal.
Figure 3:
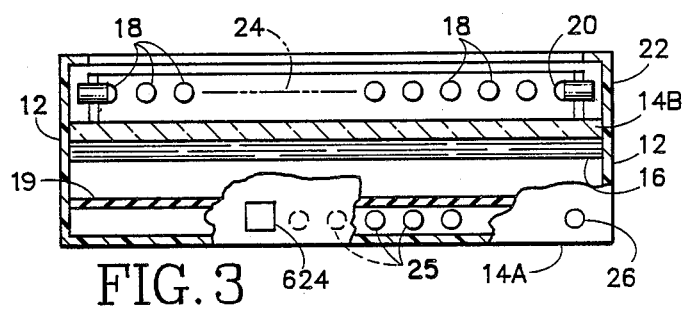
FIG. 3 is a sectional view taken on the line III—III of FIG. 2.
Figure 4:
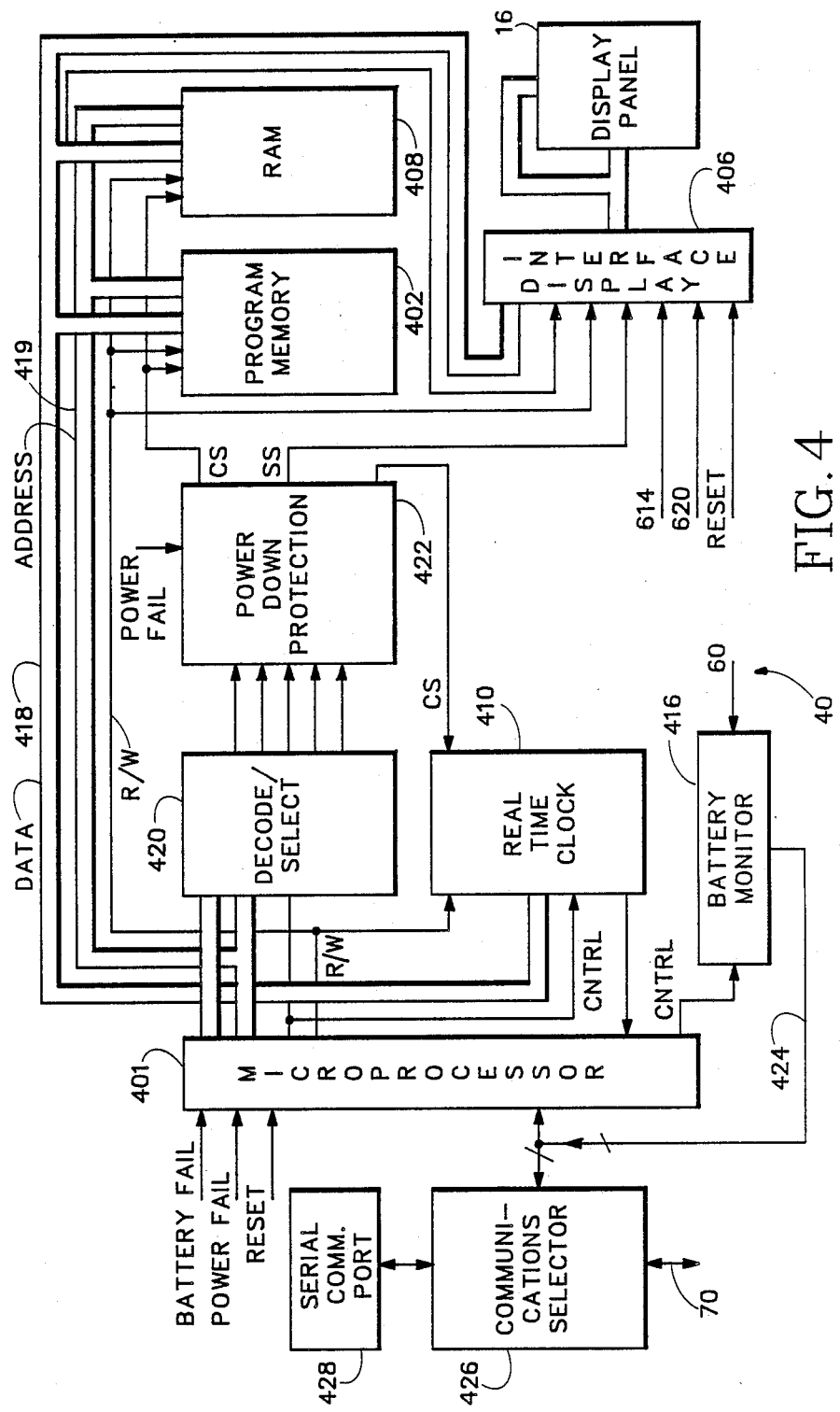
FIG. 4 is a block diagram of a display panel control circuit which forms part of the remote access terminal.

The test system illustrated in FIG. 1 comprises a host computer 2 for receiving and storing data relating to tests that are to be performed on an aircraft under test and to the results of tests that have already been performed. A mobile test station 4 has a connector plug 5 which is fitted in a receptacle 6 of the aircraft under test, for automatically carrying out tests on the aircraft and transmitting the results of the tests to the host computer 2. The test system also comprises a remote access terminal 8, which is a portable, hand-held, self-contained, battery operated terminal which is used when carrying out manual tests on the aircraft. The remote access terminal, which is illustrated in greater detail in FIGS. 2, 3 and 4, is shown in FIG. 1 as being received in a holster 10 for recharging of its batteries and for communication of data between the terminal 8 and the host computer 2. When manual tests are to be carried out, the remote access terminal is removed from the holster 10.

The major functional elements of the remote access terminal are an infrared touch screen device, a matrix LC display device, and a power supply. The remote access terminal 8 is generally rectangular in form and comprises minor walls 12 and major walls 14A and 14B. The minor walls 12 and the major wall 14A are made of a synthetic plastic material that is opaque to visible light but substantially transparent to infrared light. The major wall 14B is made of a synthetic plastic material that is transparent to visible light. The walls 12 and 14 define an interior space which accommodates the LC display device, various parts of the touch screen device, and the power supply.

Figure 5:
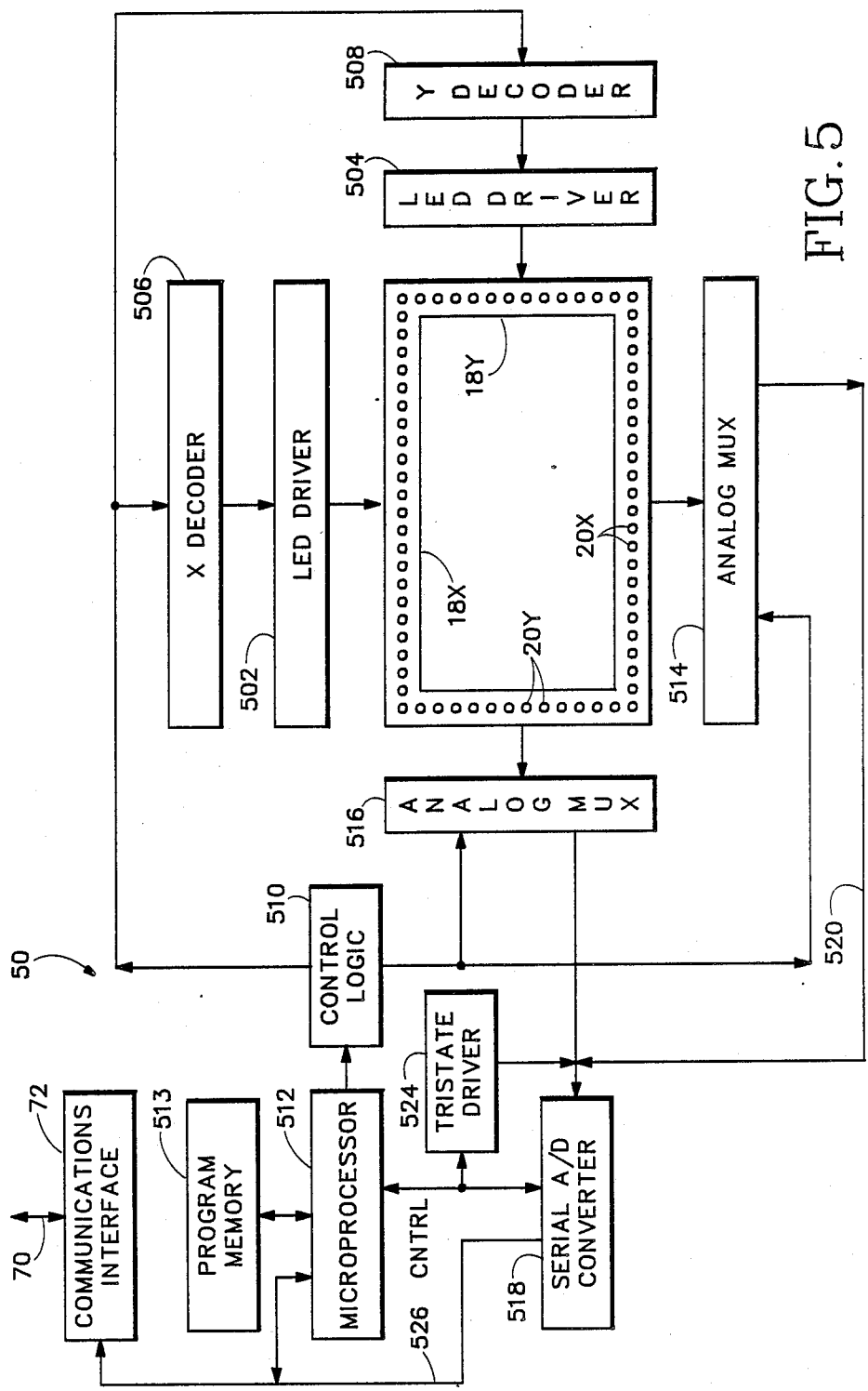
FIG. 5 is a block diagram of a touch screen control circuit which forms part of the remote access terminal.

The LC display device comprises a display panel 16 having 200×640 pixels, and a control circuit 40 (FIG. 4) mounted on a circuit board 19 for controlling the nature of the display provided by the display panel 16. The infrared touch screen device comprises LEDs 18 and phototransistors 20. The LEDs 18 are arranged in a row of 32 LEDs 18X and a column of 16 LEDs 18Y, and similarly the phototransistors 20 are arranged in a row of 32 phototransistors 20X and a column of 16 phototransistors 120Y. A rim 22 which surrounds and stands upwardly from the wall 14B accommodates and aligns the LEDs and phototransistors. The LEDs and the phototransistors are the emitter and detector elements of the infrared touch screen device and define a beam plane 24. The wall 14B, which is beneath the beam plane 24, constitutes the tactile feedback element of the touch screen device and protects the LC display panel 16. The touch screen device also comprises a control circuit 50 (FIG. 5) mounted on the circuit board 19 and connected to the LEDs 18 and the phototransistors 20.

Figure 6:
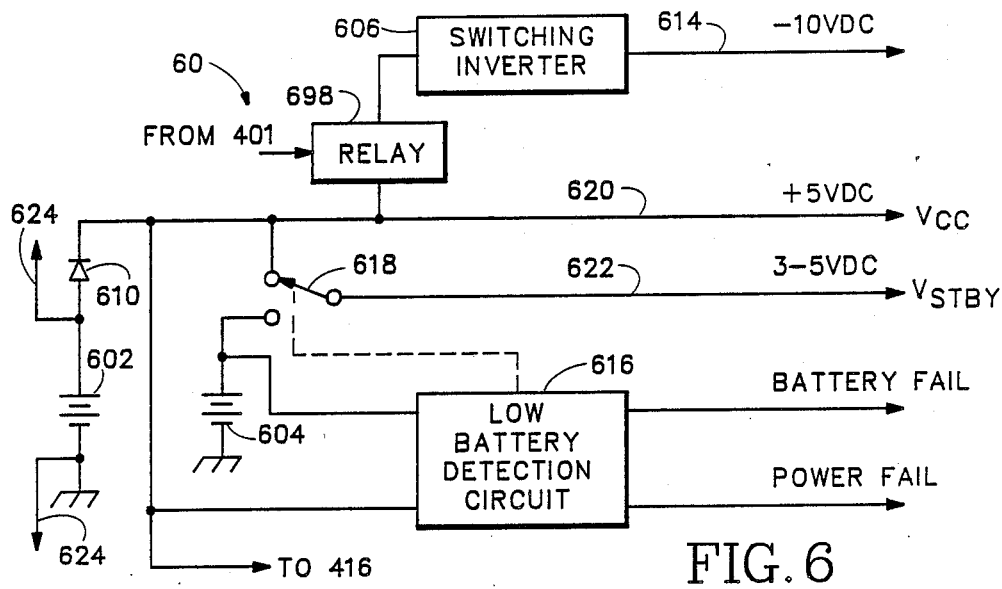
FIG. 6 is a block diagram of a power supply circuit.

The power supply, which is shown at 60 in FIG. 6, supplies operating current for the LC display device and the touch screen device. The power supply comprises a rechargeable Ni-Cad main battery 602 which provides current at 6 volts DC, a lithium standby battery 604 which provides current at 3 volts DC, and a power supply circuit. The main battery 602 is connected through a diode 610, for reverse power protection, to a terminal 620 for providing current to operate the control circuit 50 and certain components of the control circuit 40. The other components of the control circuit 40 receive operating current from a terminal 622, which is connected by a switch 618 either to the diode 610 or to the standby battery 604. The voltage drop across the diode 610 is approximately one volt, and therefore if the switch 618 connects the terminal 622 to the diode 610, the battery 602 provides current at the terminals 620 and 622 at +5 volts DC and the standby battery 604 is prevented from discharging. If the switch 618 connects the terminal 622 to the battery 604, the battery 604 provides current at the terminal 622 at +3 volts DC, and does not provide current at the terminal 620. The diode 610 is also connected to a switching inverter 606 which receives current provided by the main battery and provides current at −10 volts DC at a terminal 614 for driving the liquid crystal display panel 16. The inverter 606 can be selectively switched on and off by means of an electronic relay 698 controlled by a discrete logic signal from the microprocessor 401.

The state of the switch 618 is controlled by a low battery detection circuit 616 which monitors the voltage provided by the main battery 602. So long as the voltage provided by the main battery remains above a threshold level, the switch 618 connects the terminal 622 to the diode 610. However, if the voltage falls below the threshold level, the circuit 616 causes the switch 618 to connect the terminal 622 to the battery 604 instead of to the battery 602, thereby maintaining the supply of the current to the terminal 622, and also generates a POWER FAIL signal which is applied to the control circuit 40. The low battery detection circuit 616 also monitors the voltage provided by the battery 604 and provides a BATTERY FAIL signal to the control circuit 40 in the event that it falls below a predetermined threshold level.

The touch screen control circuit 50 comprises a row LED driver 502 having respective driver channels connected to the row LEDs 18X and a column LED driver 504 having respective channels connected to the column LEDs 18Y. The rated constant current for the LEDs is 20 mA at 5 volts DC. When a driver channel is enabled, the associated LED is energized at a current of approximately 200 ma at 5 volts DC. A row decoder 506 and a column decoder 508 select one of the channels of the drivers 502 and 504 to be enabled at a time in accordance with a 6-bit parallel digital signal provided by control logic 510. A microprocessor 512 (for example type 80C51) operates under control of a program stored in a program memory 513 to cause the control logic 510 to generate signals such that the LEDs 18 are energized sequentially for intervals of 50 us. Each LED is energized at a frequency of 20 Hz. Thus, the LEDs are energized at a duty cycle of 0.1%.

The phototransistors 20X and 20Y have respective load resistors (not shown), to develop an output voltage dependent on the intensity with which the phototransistor is illuminated.

Figure 8:
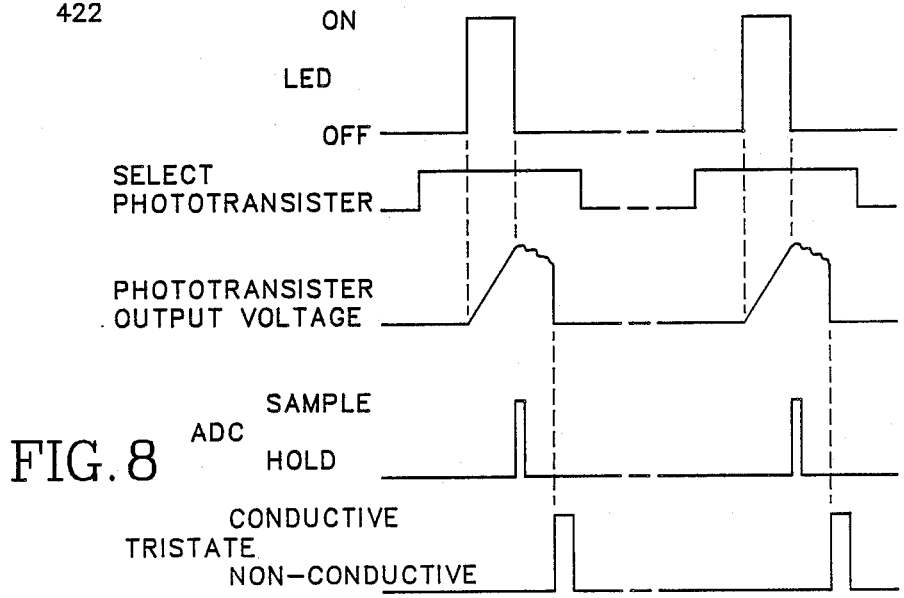
FIG. 8 is a timing diagram.

The phototransistors 20X and 20Y are connected to row and column multiplexers 514 and 516. The multiplexers select the phototransistors sequentially, at the same frequency as the LEDs are energized and in a controlled phase relationship to the energization of the phototransistors. As shown in FIG. 8, a phototransistor is selected by the multiplexer 514 or 516 during a time that brackets the interval during which the associated LED is energized. The phototransistors are selected under control of a 6-bit parallel digital signal applied to the multiplexers 514 and 516 by the control logic 510. The output voltage provided by the selected phototransistor is applied to a conductor 520.

A tristate driver 524 is controlled by the microprocessor 512 and is connected to the conductor 520. The tristate driver 524 functions as a switch having a conductive state, in which it establishes a low impedance path between the conductor 520 and ground, and a non-conductive state, in which the path between the conductor 520 and ground has a high impedance. The switch is placed in its conductive state for a short interval during the time for which a phototransistor is selected, after the associated LED has ceased to be energized, as shown in FIG. 8. Thus, the detector junction of the selected phototransistor is discharged. After sufficient time to discharge the junction has elapsed, the switch is placed in its non-conductive state. When the switch is in the non-conductive state, it has substantially no effect on the voltage of the conductor 520.

A serial analog-to-digital converter (ADC) 518 samples the voltage on the conductor 520 during each interval for which a phototransistor is selected, at the end of the time during which the LED is energized and before the tristate driver is placed in its conductive condition. The output signal of the ADC 518 is applied to a serial data bus 526 which is connected to the microprocessor 512. The microprocessor 512 determines whether the sample value is such that the selected phototransistor is being illuminated by the associated LED or the beam emitted by the LED is being blocked.

The LEDs 18 and phototransistors 20 resolve the area of the wall 14B into 32 slots and 16 slices, the crossing areas of which form 512 grid squares. When an LED is energized, the microprocessor 512 examines the signal provided by the ADC 518 in order to determine whether the corresponding phototransistor is being illuminated. Thus, the microprocessor functions as a comparator and determines whether the digital output signal provided by the ADC represents a voltage that is higher or lower than a predetermined threshold voltage, which indicates that the phototransistor is being illuminated. When a user of the remote access terminal touches the wall 14B with his finger, the beams provided by at least one of the LEDs 18X and at least one of the LEDs 18Y are broken and accordingly the corresponding phototransistors are not illuminated. The microprocessor 512 determines which beams have been broken and applies a signal indicating which of the 512 grid squares has been touched to the circuit 40 by way of the bus 526, a communications interface 72 and a serial data bus 70. The communications interface controls access to the bus 70 by the microprocessor 512, and ensures that signals provided by the ADC 518 are applied to the microprocessor 512 and not to the bus 70.

The display device control circuit 40 comprises a microprocessor 401 (type 80C51) having a data bus 418 and an address bus 419. The microprocessor operates under control of a program stored in a program memory 402 to provide signals over the data bus 418 to a display panel interface 406. The program memory 402 is composed of two 32 Kbyte programmable read only memory (PROM) chips. The display panel interface 406 is connected to the display panel 16 to cause row and column electrodes (not shown) of the display panel to be electrically stressed and create a desired display. The display has three principal display areas, namely a status display area, an instruction display area and a data entry display area.

A random access memory (RAM) 408 is connected to the data bus 418 and address bus 419. The RAM 408 comprises eight 32 Kbyte chips. In normal operation of the remote access terminal 8, data that has previously been loaded into the RAM 408 is used to determine the nature of the displays provided in the instruction display area and the data entry display area; and when the wall 14B is touched at a location over the data entry display area, data defining the location at which the wall 14B was touched is loaded into the RAM 408.

The circuit 40 includes a battery monitor 416. The battery monitor 416 is a serial ADC having an input terminal connected to the battery 602 and an output terminal connected to the microprocessor 401 by way of a serial data bus 424. A serial communications selector 426 controls communication between the bus 424, the bus 70 and an external communications port 428. The circuit 40 also includes a real time clock 410 which receives operating current from the terminal 622 of the power supply 60 and thus continues to operate even if the switch 618 is placed in its non-conductive state. The real time clock operates continuously and keeps track of time (hour, minute and second). Once each second, the real time clock generates an interrupt signal which is applied to the microprocessor 401. In response to the interrupt signal, the microprocessor executes three operations.

The first operation is to apply a read enable signal to the real time clock and, on application of a control signal, read the current time from the real time clock by way of the parallel data bus 418. The microprocessor applies a write enable signal to the LCD interface 406 and writes the current time to the LCD interface so as to cause the LCD display panel to display the current time in the status display area. In this fashion, the current time is updated each second.

The second operation performed by the microprocessor is to apply a control signal to the battery monitor 416. The battery monitor responds to the control signal by sampling the output voltage provided by the battery 602 and placing a digital signal representing this voltage on the serial data bus 424. The microprocessor 401 interprets this digital signal as a percentage of maximum charge, and places a signal on the parallel data bus 418 which causes the display panel 16 to provide a display in the status display area of the percentage of charge. If the digital signal falls below a predetermined value, the microprocessor causes the display panel to provide a display in the instruction display area warning the user that the battery 602 needs to be recharged.

The third operation is to determine how long a time has elapsed since the wall 14B was last touched: each time the microprocessor 401 receives a signal from the circuit 50 indicating that the wall 14B has been touched, it resets an internal timer, and on each interrupt the microprocessor 401 examines the state of the timer. This information is used to determine the operating state of the terminal 8, in a manner which is explained below.

The circuit 40 further comprises a decode/select circuit 420 which is connected to the data and address buses 418 and 419 and generates appropriate chip select signals on twelve lines in response to signals received from the microprocessor. The chip select signals are applied to a power down protection circuit 422. In normal operation of the terminal 8, the power down protection circuit applies the chip select signals provided by the decode/select circuit 420 to the memory 402, the RAM 408, the LCD interface 406 and the real time clock 410.

When the terminal 8 is placed in the holster 10, the microprocessor 401 reads data from the memory 408 and applies it to the serial data bus 70 for uploading to the host computer 2 in a manner which will be described below. Subsequently, data defining instructions for performing a sequence of tests and including "blanks" for receiving the results of the tests is downloaded from the host computer to the terminal 8 and is written by the microprocessor 401 into the memory 408. When the terminal is removed from the holster the microprocessor reads the data from the memory 408. This data, when acted upon in accordance with the program stored in the program memory, causes the display device to display instructions for performing a test in the instruction display area, and to display a simulated data entry device, for entry of data representing the result of the test, in the data entry display area. For example, the test instructions might be in alphanumeric form and call for the voltage between two points to be measured and recorded. In this case, a simulated key pad is displayed in the data entry display area. The user measures the voltage between the two designated points and sequentially touches the wall 14B in the appropriate pad areas of the simulated key pad. The microprocessor 512 determines which beams were broken when the user touched the wall 14B and provides signals to the circuit 40 indicating the grid squares touched by the user. The microprocessor 401 interprets this information in relation to the simulated key pad and writes the resulting data value into the appropriate "blank" defined by the contents of the memory 408. When a test result has been entered into the memory 408, the display is scrolled down, clearing text from the bottom of the instruction display area and exposing new text at the top of the instruction display area.

The nature of the data entry device is configured by the circuit 40 having regard to the nature of the test. For example, if the test does not call for measurement of a value but a determination as to whether a specified condition exists, the data entry display area may provide a display of only two touch areas designated YES (for the condition does exist) and NO (for the condition does not exist).

In addition, because the touch screen overlies the entire display panel, it is possible to accommodate user operations other than data entry. For example, if the microprocessor 512 determines that the wall 14B has been touched at the top of the instruction display area, the circuit 40 causes the displayed text to scroll down, exposing new text at the top of the display area and clearing text from the bottom of the display area; whereas if the wall 14B is touched near the bottom of the instruction display area, the text scrolls up, exposing once more text that was previously displayed and clearing text from the top of the display area. However, the user is not able to influence the contents of the program memory 402 or the test procedure instructions stored in the memory 408. The user's interactions with the circuits 40 and 50 are limited to reading test instructions and entering data representative of test results for storage in the memory 408.

Another operation that is accommodated by the touch screen device is entry of the correct time in the real time clock 410, e.g. when the terminal 8 is first operated. The microprocessor enters a time set routine in which the user enters data representing the current time by way of the touch screen device and the microprocessor 401 writes this data to the real time clock 410.

When the sequence of tests defined by the instructions stored in the memory 408 has been completed, and data representing the results of the tests has been written into the "blanks", the remote access terminal is returned to the holster. In the holster 10, exposed electrical terminals 624 of the power supply 60 (one of which terminals can be seen in FIG. 3) engage corresponding terminals of a charging circuit (not shown), and the main battery 602 of the remote access terminal is recharged. In addition, the holster incorporates a serial communications port 21 which communicates with the serial communications port 428 for transferring data between the memory 408 and the host computer. The host computer provides a signal to the microprocessor 401 by way of the communications ports which causes the microprocessor 401 to read the contents of the memory 408 (test instructions plus results) and upload them into the host computer. When uploading has been completed, the microprocessor 401 provides a signal to the host computer which causes the host computer to download the next sequence of test instructions to the memory 408.

The communications ports 21 and 428 do not employ plug and socket connectors but LEDs and phototransistors. Thus, an array 25 of phototransistors and LEDs is provided inside the remote access terminal and a complementary array is provided in the holster. Infrared light emitted by one of the LEDs in one array is transmitted by the synthetic polymer material of the casing and is received by the corresponding phototransistor of the other array.

The remote access terminal 8 has three main operating states. In the normal state, which applies when the main battery is fully charged, the terminal operates in the manner described above.

The second operating state of the terminal is an idle state. The idle state is entered if ten minutes elapse without the circuit 50 indicating that the wall 14B has been touched, or if the battery monitor 416 indicates that the state of charge of the main battery has reached a predetermined level, which is lower than the level at which the microprocessor 401 causes the warning to be given that the battery 602 should be recharged. In the play by inhibiting application of a chip select signal to the display interface 406 and actuates the relay 698 to switch off the inverter 606. Also, the microprocessor 401 instructs the circuit 50 to reduce the frequency at which the control logic 510 energizes the LED drivers from 20 Hz to 1 Hz. However, the microprocessors 401 and 512 continue to operate. If the terminal 8 is in the idle state because more than ten minutes have elapsed without the wall 14B having been touched, the terminal 8 returns to its normal state when the circuit 50 detects that the wall 14B has been touched. If the terminal 8 is in the idle state because the battery monitor 416 has indicated that the charge of the main battery is below the lower predetermined level, the terminal will return to the normal state when the battery is recharged.

Figure 7:
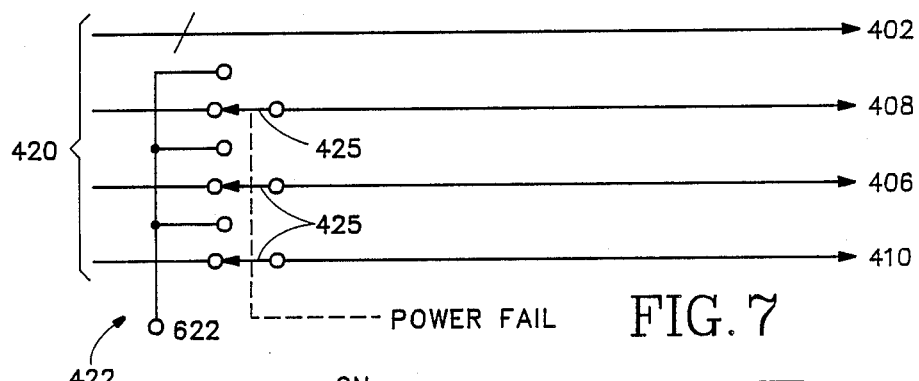
FIG. 7 is a schematic diagram of a part of the display panel control circuit.

The third state is a power down state, which is entered when the low battery detection circuit 616 generates the POWER FAIL signal. When the POWER FAIL signal is generated, the switch 618 connects the terminal 622 to the battery 604. The POWER FAIL signal is applied to the power down protection circuit 422. The power down protection circuit 422 comprises solid state switches 425 (FIG. 7) which are connected in the chip select lines leading to the RAM chips, the display panel interface 406 and the real time clock 410. The switches 425 respond to the POWER FAIL signal provided by the low battery detection circuit 616 by connecting the chip select lines for the RAM 408, the LCD interface 406 and the real time clock 410 to the power supply terminal 622, so that these chip select lines are held high by the battery 604, without reliance on the battery 602. This prevents these components from being selected for writing of data. By preventing selection of the RAM 408 and the real time clock 410, the possibility of data stored in the RAM 408 and the current time stored in the real time clock 410 being overwritten is avoided. By preventing selection of the LCD interface 406, the possibility is avoided of an erroneous display being provided when power is restored.

In addition to causing the power down protection circuit to hold the chip select lines of the RAM 408, the LCD interface 406 and the real time clock 410 high, the POWER FAIL signal is applied to the microprocessor 401 and switches the microprocessor 401 off. Prior to being switched off, the microprocessor actuates the relay 698 to switch off the inverter 606. Current from the standby battery 604 is supplied only to the real time clock 410 and the RAM 408. The circuit 50, which relies entirely on the main battery, does not operate. The remote access terminal 8 cannot be brought to its normal operating state from the power down state until a reset button 26 (FIG. 3) is pressed. The reset button is the only user-actuable control that does not rely on the touch screen device. If the reset button is pressed while the voltage of the main battery 602 is still below the threshold value established by the low battery detection circuit 616, the circuit 616 will immediately generate the POWER FAIL signal and the terminal will return to the power down state. When the terminal is placed in the holster, the reset button is automatically engaged when the terminals 624 of the main battery 602 are connected to the terminals of the charging circuit. Even though the battery 602 is still in a low state of charge, the voltage applied by the charging circuit prevents the low battery detection circuit 616 from generating the POWER FAIL signal, and accordingly the circuits 40 and 50 are able to operate using current supplied by the charging circuit.

When the low battery detection circuit 616 provides the BATTERY FAIL signal to the circuit 40, the microprocessor 401 generates a display which advises the user that the terminal 8 requires service.

The programs stored in the memory 402 may be altered by replacing one or both of the PROM chips by a chip in which different instructions are stored. However, this involves returning the remote access terminal to a service facility, which may not be convenient. This difficulty may be avoided by substituting a RAM chip for one of the PROM chips that form the memory 402. The program memory RAM chip is connected to the power supply 60 and the power down protection circuit 422 in similar fashion to the RAM 408, so that it receives operating current from the terminal 622 of the power supply circuit 60 and its chip select terminal is held high when the remote access terminal is in the power down state and the program is therefore protected against loss. The program memory RAM chip therefore is a non-volatile but alterable program storage device. The contents of the program memory RAM chip may be changed by using the host computer to apply new instructions through the serial communications port 428 to the portion of the program memory address space that contains the program memory RAM chip.

In a preferred implementation of the invention, all the integrated circuit chips are fabricated using CMOS technology, since CMOS circuits consume less power than equivalent TTL circuits.

It will be appreciated that the present invention is not restricted to the particular embodiments that have been described, and that variations may be made therein without departing from the scope of the invention as defined in the appended claims and equivalents thereof. For example, although it is preferred that the LEDs of the touch screen device be energized at a frequency of at least 20 Hz and at a power level at least 10 times the rated constant power level of the LEDs, the frequency could be reduced as low as about 10 Hz and the power level to about 5 times the rated constant power level.

I claim:

1. Photoelectric apparatus comprising:
   an emitter element for intermittently emitting a beam of electromagnetic radiation,
   a detector element for receiving radiation emitted by the emitter element, the detector element having a semiconductor junction and having an output terminal at which a voltage representative of intensity of electromagnetic radiation falling on the junction is developed, and
   switch means for intermittently grounding the output terminal of the detector element when the emitter element is not emitting the beam of electromagnetic radiation.

2. Apparatus according to claim 1, wherein the emitter element is a light emitting diode and the detector element is a phototransistor.

3. An input device for detecting entry of an probe into a sensing space, said device comprising:
   at least one emitter element for emitting a beam over the sensing space,
   at last one detector element for receiving the beam, the detector element having a semiconductor junction and an output terminal,
   drive means for intermittently energizing the emitter element whereby the detector element provides a signal at a circuit node, which is connected to said output terminal,
   switch means for selectively grounding said circuit node intermittently and in timed relationship to the energization of the emitter element, and
   monitor means operative when the emitter element is energized to determine whether the beam emitted by the emitter element is reaching the detector element.

4. A device according to claim 3, wherein the emitter element comprises an infrared light emitting diode.

5. A device according to claim 3, comprising an array of emitter elements and a corresponding array of detector elements for receiving the beams emitted by the emitter elements respectively, and wherein the drive means are operative to energize the emitter elements sequentially and the monitor means comprise a selector which operates when an emitter element is energized to select the corresponding detector element.

6. A portable, self-contained remote access terminal for collecting and temporarily storing data, comprising:
   a liquid crystal display panel for providing legible instructions as to data to be collected,
   a touch screen for entry of data, the touch screen being substantially transparent and in overlaying relationship with the display panel so that the display panel can be seen through the touch screen and comprising an array of emitter elements for emitting respective beams over a sensing space, an array of detector elements associated respectively with the emitter elements for receiving the beams emitted by the emitter elements, the detector elements each having a semiconductor junction and an output terminal, drive means for intermittently and sequentially energizing the emitter elements, selector means for selecting the associated detector elements in timed relationship with energization of the emitter elements, whereby the output terminals of the detector elements are sequentially connected to a circuit node, means operative when an emitter element is energized to determine whether the beam emitted by the emitter element is reaching the associated detector element, and switch means for selectively grounding said circuit node intermittently and in timed relationship to the energization of the emitter elements,
   data storage means for storing data which determines the nature of the display provided by the display panel and data entered by way of the touch screen, and
   battery means connected to the display panel, the touch screen and the storage means for supplying operating current thereto.

7. A terminal according to claim 6, wherein the touch screen is an infrared touch screen.

8. A terminal according to claim 6, further comprising a communications port for transferring data between the data storage means and a host computer.

9. A terminal according to claim 6, wherein the battery means comprises a main battery for providing operating current for the display panel and the touch screen, and a standby battery for providing an operating current for the storage means to preserve data stored in the storage means in the event that the main battery ceases to provide sufficient operating current.

10. A terminal according to claim 6, wherein the touch screen comprises an array of emitter elements for emitting respective beams over a sensing space, an array of detector elements associated respectively with the emitter elements for receiving the beams emitted by the emitter the drive means comprise; means for intermittently energizing the emitter elements at a lower level at least 3 times the rated constant power level of the emitter elements and at a frequency of at least about 15 Hz and a duty cycle substantially less than about 2%. and means operative when an emitter element is energized to determine whether the beam emitted by the emitter element is reaching the associated detector element.

11. A terminal according to claim 6, wherein the emitter elements are light emitting diodes and the detector elements are phototransistors each having an output terminal, and the selector means are operative to connect the output terminals of the phototransistors sequentially to said circuit node.

12. A portable, self-contained, battery operated remote access terminal for collecting and temporarily storing data, comprising:
   a display panel for providing legible instructions as to data to be collected,
   a touch screen for entry of data, the touch screen being substantially transparent and in overlaying relationship with the display panel so that the display panel can be seen through the touch screen, and the touch screen comprising an array of emitter elements for emitting respective beams over a sensing space, and an array of detector elements associated respectively with the emitter elements for receiving the beams emitted by the emitter elements, the detector elements each having a semiconductor junction and an output terminal,
   drive means for intermittently and sequentially energizing the emitter elements, selector means for selecting the associated detector elements in timed relationship with energization of the emitter elements and, whereby the output terminals of the detector elements are sequentially connected to a circuit node, switch means for selectively grounding said circuit node intermittently and in timed relationship with the energization of the emitter elements, means operative when an emitter element is energized to determine whether the beam emitted by the emitter element is reaching the associated detector element, data storage means for storing data which determines the nature of the display provided by the display panel and data entered by the way of the touch screen, and power supply means for operating the display panel, the touch screen and the storage means.

13. A terminal according to claim 12, wherein the emitter elements are light emitting diodes and the detector elements are phototransistors each having an output terminal, and the selector means are operative to connect the output terminals of the phototransistors sequentially to said circuit node.

14. A terminal according to claim 12, wherein the power supply means comprise a rechargeable battery and a power supply circuit for supplying operating current from the rechargeable battery to the display panel, the touch screen and the storage means.

15. A terminal according to claim 12, wherein the touch screen is an infrared touch screen and the display panel is a liquid crystal display panel.

16. A terminal according to claim 12, wherein the power supply mans comprise a main battery for providing operating current for the display panel and the touch screen, and a standby battery for providing operating current for the storage means to preserve data stored in the storage means in the event that the main battery ceases to provide sufficient operating current.

17. A terminal according to claim 12, wherein the drive means are operable to energize the emitter elements at a power level at least three times the rated constant power level of the emitter elements and at a frequency of at least about 15 Hz and at a duty cycle substantially less than about 2%.

18. A portable, self-contained, battery operated remote access terminal for collecting and temporarily storing data, comprising:

a display panel for providing legible instructions as to data to be collected, a touch screen for entry of data, the touch screen being substantially transparent and in overlaying relationship with the display panel so that the display panel can be seen through the touch screen, the touch screen including an array of emitter elements for emitting respective beams over a sensing space, and an array of detector elements associated respectively with the emitter elements for receiving the beams emitted by the emitter elements, each detector element having a semiconductor junction and an output terminal, data storage means for storing data which determines the nature of the display provided by the display panel and data entered by way of the touch screen, drive means for energizing the emitter elements sequentially, selector means for selecting the associated detector elements in timed relationship with energization of the emitter elements and, whereby the output terminals of the detector elements are sequentially connected to a circuit node, switch means for selectively grounding said circuit node intermittently and in timed relationship with the energization of the emitter elements, and power supply means for operating the display panel, the touch screen and the storage means.

19. A terminal according to claim 18, wherein the emitter elements are light emitting diodes and the detector elements are phototransistors each having an output terminal, and the selector means are operative to connect the output terminals of the phototransistors sequentially to said circuit node.

20. Data collection apparatus comprising:

a host computer having a communications port, and a portable, self-contained, battery operated remote access terminal for collecting and temporarily storing data and comprising:

a liquid crystal display panel for providing legible instructions as to data to be collected, an infrared touch screen for entry of data, the touch screen being substantially transparent and in overlaying relationship with the display panel so that the display panel can be seen through the touch screen, the touch screen comprising an array of emitter elements for emitting respective beams over a sensing space, an array of detector elements associated respectively with the emitter elements for receiving the beams emitted by the emitter elements, the detector elements each having a semiconductor junction and an output terminal, drive means for intermittently and sequentially energizing the emitter elements, selector means for selecting the associated detector elements in timed relationship with energization of the emitter elements, whereby the output terminals of the detector elements are sequentially connected to a circuit node, means operative when an emitter element is energized to determine from the signal present at the circuit node whether the beam emitted by the emitter element is reaching the associated detector element, and switch means for selectively grounding said circuit node intermittently and in timed relationship to the energization of the emitter elements, data storage means for storing data which determines the nature of the display provided by the display panel and data entered by way of the touch screen, a communications port which mates with the communications port of the hose computer for transferring data between the data storage means and the host computer, and rechargeable battery means connected to the display panel, the touch screen and the storage means for supplying operating current thereto.

21. Apparatus according to claim 20, wherein the rechargeable battery means comprise a main battery for providing operating current for the display paneland the touch screen, and a standby battery for providing operating current for the storage means to preserve data stored in the storage means in the event that the main battery ceases to provide sufficient operating current.

22. Apparatus according to claim 20, wherein the drive means are operable for energizing the emitter elements at a power level at least 3 times the rated constant power level of the emitter elements and at a frequency of at least about 15 Hz and at a duty cycle substantially less than about 2%.

23. A terminal according to claim 20, wherein the emitter elements are light emitting diodes and the detector elements are phototransistors each having an output terminal, and the selector means are operative to connect the output terminals of the phototransistors sequentially to said circuit node.

* * * * *

UNITED STATES PATENT AND TRADEMARK OFFICE
CERTIFICATE OF CORRECTION

PATENT NO.   :   4,928,094
DATED        :   May 22, 1990
INVENTOR(S)  :   Mark L. Smith It is certified that error appears in the above-identified patent and that said Letters Patent is hereby corrected as shown below:

Abstract, line 1, insert a comma (,) after "portable".

Abstract, line 12, insert a comma (,) after "elements".

Column 4, line 29, delete "200X640" and insert --200 x 640--.

Column 5, line 33, delete "ma" and insert --mA--.

Column 5, line 41, delete "us" and insert --µs--.

Column 9, line 34, after "In the" insert --idle state, the microprocessor turns off the display--, and delete "play" in line 35.

Column 11, line 29, delete "last" and insert --least--.

Column 12, line 26, delete "comprises" and insert --comprise--.

Column 12, line 27, delete "an" after "providing".

Column 12, lines 32-36, delete "the touch screen comprises an array of emitter elements for emitting respective beams over a sensing space, an array of detector elements associated respectively with the emitter elements for receiving the beams emitted by the emitter the". (Amendment dated November 23, 1989, page 3, line 3.)

UNITED STATES PATENT AND TRADEMARK OFFICE
CERTIFICATE OF CORRECTION

PATENT NO. : 4,928,094
DATED : May 22, 1990
INVENTOR(S) : Mark L. Smith It is certified that error appears in the above-identified patent and that said Letters Patent is hereby corrected as shown below:

Column 12, line 36, after "comprise" delete the semicolon (;).

Column 12, line 37, delete "lower" and insert --power--.

Column 12, lines 40-44, after "2%." delete "and means operative when an emitter element is energized to determine whether the beam emitted by the emitter element is reaching the associated detector element.--.

Column 13, line 3, after "elements" delete "and".

Column 13, line 34, after "supply" delete "mans" and insert --means--.

Column 13, line 66, after "elements" delete "and".

Column 14, line 44, after "port of the" delete "hose" and insert --host--.

Column 14, line 52, after "display" delete "pane land" and insert --panel and--.

UNITED STATES PATENT AND TRADEMARK OFFICE
CERTIFICATE OF CORRECTION

PATENT NO. : 4,928,094

DATED : May 22, 1990

INVENTOR(S) : Mark L. Smith

It is certified that error appears in the above-identified patent and that said Letters Patent is hereby corrected as shown below:

Column 14, line 52, after "display" delete "paneland" and insert --panel and--.

Signed and Sealed this

Fourteenth Day of January, 1992

Attest:

HARRY F. MANBECK, JR.

*Attesting Officer*    *Commissioner of Patents and Trademarks*